Figure 1:
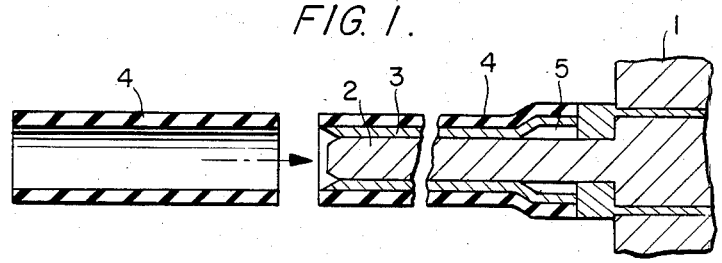

United States Patent [19]

Willemsen et al.

[11] Patent Number: 4,500,485
[45] Date of Patent: Feb. 19, 1985

[54] METHOD FOR THE PRODUCTION OF A HOSE OF A SHAPE-CURED ELASTOMERIC MATERIAL, SUCH AS VULCANIZED RUBBER, ESPECIALLY AN AUTOMOTIVE RADIATOR COOLANT HOSE

[75] Inventors: Henricus P. Willemsen, Aarle-Rixtel; Leonardus M. A. Vaessen; Rudolf J. G. A. van der Hoorn, both of Nuenen, all of Netherlands

[73] Assignee: Vredestein N.V., Velp, Netherlands

[21] Appl. No.: 518,223

[22] Filed: Jul. 28, 1983

[30] Foreign Application Priority Data

Aug. 2, 1982 [NL] Netherlands ............... 8203075

[51] Int. Cl.³ ............................................. B29H 5/01
[52] U.S. Cl. ..................................... 264/313; 264/339; 264/347; 425/393
[58] Field of Search ............... 264/347, 236, 285, 339, 264/313, 295; 425/392-393

[56] References Cited

U.S. PATENT DOCUMENTS

| 1,602,165 | 10/1926 | Parker | 264/339 |
| 3,814,565 | 6/1974 | Cahour et al. | 425/393 |
| 3,992,505 | 11/1976 | Tally | 264/317 |
| 4,080,141 | 3/1978 | Usui | 425/393 |
| 4,110,396 | 8/1978 | Reynolds | 264/320 |
| 4,118,162 | 10/1978 | Baumgarten | 264/295 |
| 4,160,006 | 7/1979 | Patzner et al. | 425/393 |
| 4,197,079 | 4/1980 | Patzner et al. | 425/393 |
| 4,242,296 | 12/1980 | Bricker | 264/339 |
| 4,298,330 | 11/1981 | Davis | 425/403 |

FOREIGN PATENT DOCUMENTS

| 2420937 | 12/1974 | Fed. Rep. of Germany | 425/392 |
| 1297477 | 11/1961 | France | 425/392 |
| 2126533 | 9/1972 | France . | |
| 56-136326 | 10/1981 | Japan | 264/285 |

Primary Examiner—Jeffery Thurlow
Attorney, Agent, or Firm—Karl W. Flocks; Sheridan Neimark

[57] ABSTRACT

A method for the production of a hose of a shape-cured elastomeric material, such as vulcanized rubber, especially an automotive radiator coolant hose, which method comprises the bringing of the hose onto a flexible straight mandrel, sliding the flexible mandrel onto an inner mandrel portion having the finally desired configuration of the hose, curing the hose in this configuration, sliding the flexible mandrel together with the hose off said inner mandrel portion and bringing the flexible mandrel onto a straight auxiliary mandrel and sliding the hose off the mandrel.

3 Claims, 4 Drawing Figures

METHOD FOR THE PRODUCTION OF A HOSE OF A SHAPE-CURED ELASTOMERIC MATERIAL, SUCH AS VULCANIZED RUBBER, ESPECIALLY AN AUTOMOTIVE RADIATOR COOLANT HOSE

The invention relates to a method for the production of a hose of a shape-cured elastomeric material, such as vulcanized rubber, especially an automotive radiator coolant hose, according to which a hose of non-cured elastomeric material is slid onto a flexible straight mandrel comprising a helically wound thread, the hose with this mandrel being brought into the desired configuration and the hose being cured in this shape, whereupon the cured hose is slid off the mandrel.

Such a process is known from French patent specification No. 2,126,533. In this known process the flexible mandrel, together with the hose slid thereon, is brought into the desired configuration by using a sort of gutter into which the combination of hose and mandrel is brought and which gutter is of the desired shape.

A drawback of this process is that for bringing the hose with the mandrel into the gutter, the hose must be held externally, so that the hose can be damaged easily. The same will also happen at those places where the hose is pressed firmly against the walls of the gutter by the mandrel, such as will be the case e.g. in the bends to be made. In sharp bends such high loads may therefore be exerted on the material of the hose, that considerable reductions are caused in its wall thickness so that the hose will no longer meet the requirements.

If the hose is brought into the interior of a helically wound thread, the above difficulty will not arise but then the risk exists that the hose will be flattened or will collaps inwardly when the helically wound thread is bent somewhat too much.

Bringing the hose between an inner and an outer helically wound thread has the drawback that the still uncured elastomic material of the hose will be loaded too heavily because the inner mandrel will have to be brought into the desired shape by means of the uncured hose itself.

The present invention aims to provide a method by which the above drawbacks are overcome and by which the bringing into the desired configuration of the mandrel with the hose and the removal of the cured hose from the mandrel become very easy, there being no risk that the still uncured elastomeric hose is damaged when it is brought into the desired configuration.

According to the invention this is obtained by sliding the combination of the hose of non-cured material and the mandrel onto an inner mandrel portion having the finally desired configuration of the hose, the hose present on the mandrel and the inner mandrel portion being cured such as by vulcanization, subsequently the mandrel together with the hose being slid off said inner mandrel portion, the mandrel together with the hose being brought onto a straight auxiliary mandrel and the hose being slid off the mandrel.

It has appeared that sliding the flexible mandrel onto an inner mandrel portion having the finally desired configuration of the hose provides no difficulties, whereas no damage of the hose on the mandrel occurs either. When e.g. the foremost end of the mandrel, which therefore will be slid onto the inner mandrel portion first, begins to approach a bend from the inner mandrel portion, the mandrel, starting with its foremost end, is brought into the curved configuration and the hose can adjust itself easily thereto. In consequence of the fact that the hose externally is not in contact with any part and it is supported internally by the mandrel, hardly any reduction of the wall thickness of the hose occurs. It has appeared that in the outward lying portion of a bend some small ribs will be formed in the inside wall of the hose, as at that spot the still uncured elastomeric material of the hose may slightly flow inwardly between the windings of the mandrel which are spaced there from each other by the exerted force. This, however, does not present a drawback at all.

In the method according to the present invention, use is always made of operations which can be carried out easily in a mechanical way in consequence of the fact that only rectilinear movements have to be carried out for pushing the hose on and off the mandrel and for sliding the mandrel on and off the inner mandrel portion and on and off the straight auxiliary mandrel. Because only rectilinear movements have to be carried out, the method according to the present invention can be automated easily.

According to an embodiment of the invention, the method may be carried out such that when the hose is removed from the mandrel, the mandrel is held back by means of a pressure part which has been provided on a straight rod with a relatively small diameter, from which rod the hose can be removed then.

It has appeared that in this way the removal of the already shape-cured hose from the mandrel can take place easily, in spite of the fact that the mandrel is straight and the hose has a more or less curved configuration.

According to a further elaboration of the invention it may be proved that when the mandrel with the hose of non-cured material provided thereon is slid onto the inner mandrel portion having the finally desired configuration of the hose, at least one end of the hose is held clampingly on the mandrel.

It has appeared that in this way it presents no difficulties to slid the mandrel together with the still uncured hose onto an inner mandrel portion having a number of sharp bends. If in such a case the still uncured hose can move completely free with respect to the mandrel, the risk exists that the hose will slide in an uncontrolled way with respect to the mandrel, so that folds may occur in the hose at the spot of the smallest radius of curvature in the hose.

Furthermore it may be mentioned that according to Dutch patent application No. 72 01778 use can be made of a flexible tube made of helically wound thread, said tube having the finally desired configuration of the hose and into which tube the hose of uncured elastomeric material is slid after the tube has been brought into a more or less straight shape. It is true that those parts of the windings situated in the outer part of a bend will move towards one another when said tube is brought into the straight shape, but at the opposite place the windings will move away from one another, unless this is countered by exerting a pressure load on the tube. The latter, however, requires a complicated device. Moreover, it will be obvious that when such a tube is used, it will be impossible to make sharp bends in the hose, as in that case the wall of the hose will not continue to lie against the wall of the tube in the outer part of a bend.

Another drawback of the use of such a tube is that the shape thereof will start to deviate from the desired shape, after some time of use because of the continuous bringing into the straight shape deviating from its original shape.

The invention will now be explained with reference to an example of an embodiment shown in the drawing, in which FIGS. 1 to 4 show successive stages of the claimed method.

FIG. 1 shows a base part 1, provided with a straight auxiliary mandrel 2, onto which has been slid a flexible outer mandrel 3, whereafter on this mandrel 3 an uncured hose 4 has been slid, which must be provided with a widened end portion 5.

Figure 2:
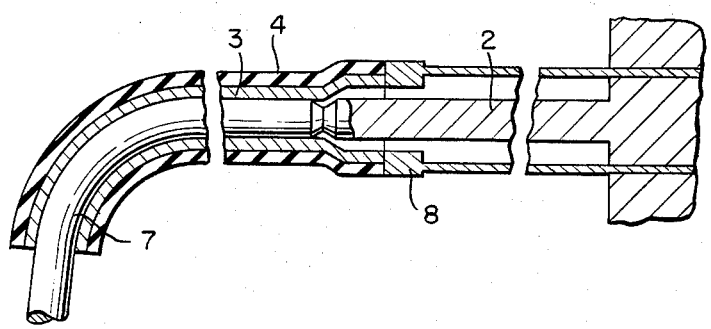

After the hose 4 has been brought onto the flexible mandrel 3, this mandrel, together with the hose 4, is slid off the straight auxiliary mandrel 2, in the way as shown in FIG. 2, and simultaneously onto an inner mandrel portion 7, which has the configuration of the hose to be produced. For that purpose one end of the mandrel portion 7 is pressed against the end of the auxiliary mandrel 2 and might be connected to this by means of a coupling. The sliding off may take place e.g. by means of the hydraulically or mechanically movable pushing system 8.

After the mandrel 3 together with the hose 4 has been slid onto the inner mandrel portion 7, the curing e.g. vulcanization of the material of the hose 4 takes place.

Figure 3:
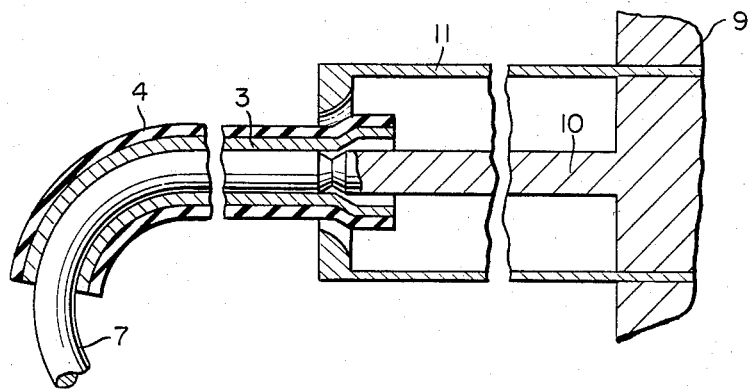

After the curing use is made of a device which, as shown schematically in FIG. 3, consists of a base 9, with a straight auxiliary mandrel 10 thereon, onto which the combination of the flexible mandrel 3 and the hose 4 is slid by means of the hydraulically or mechanically movable pulling device 11. Again, the end of the inner mandrel portion 7 is laid against and, if desired, connected to the free end of the auxiliary mandrel 10.

Figure 4:
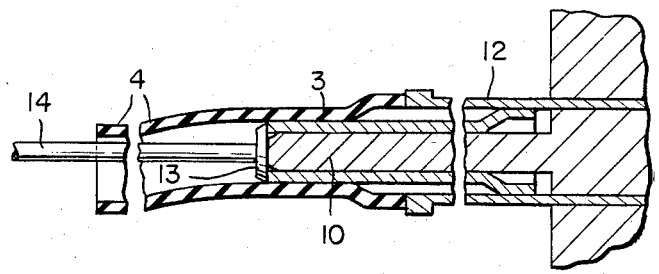

After the whole combination 3,4 has been slid onto the straight auxiliary mandrel 10, use is made of the pushing system 12 as shown in FIG. 4 in order to slid the hose 4 off the flexible mandrel 3. For this purpose a pressure part 13 is placed against the end of the flexible mandrel 3 by means of a rod 14 with a relatively small diameter, so that the hose 4 lands on the rod 14. The hose 4 can then be removed from the rod 14 easily, whereupon it is ready for use.

Although the drawing shows the mandrel 3 as consisting of one single piece, it will be obvious that the straight end, which in FIG. 1 is located at the extreme righthand side, may consist e.g. of a sleeve, to which the flexible mandrel is connected.

Furthermore it is possible to provide the hose with a widened end portion not only at the one end as shown in the drawing. A widened end portion at the other end may be obtained e.g. by having extended the left-hand end of the hose 4 as seen in FIG. 1 beyond the mandrel 3 and by assuring that this projecting part is shifted on a thickened portion of the mandrel portion 7 onto which the flexible mandrel 3 is slid in accordance with FIG. 2.

All these possibilities, however, will be obvious to the expert and require no further explanation.

We claim:

1. A method for the production of a hose of a shape-cured elastomeric material, such as vulcanized rubber, especially an automotive radiator coolant hose, said method comprising:
    (a) sliding a flexible mandrel comprising a helically wound thread onto a straight auxiliary mandrel;
    (b) bringing a hose of non-cured material on said flexible mandrel;
    (c) sliding the combination of the hose of non-cured material and said flexible mandrel off the straight auxiliary mandrel and onto an inner mandrel portion having the finally desired configuration of the hose;
    (d) curing said hose present on the flexible mandrel and on the inner mandrel portion;
    (e) sliding the flexible mandrel together with the cured hose off said inner mandrel portion;
    (f) bringing the flexible mandrel together with the cured hose onto a straight auxiliary mandrel; and
    (g) sliding the hose off said flexible mandrel.

2. A method according to claim 1 according to which the flexible mandrel is held back by means of a pressure part when said cured hose is removed from said flexible mandrel, said pressure part being provided on a straight rod with a relatively small diameter, from which rod the hose can be removed afterwards.

3. A method according to claim 1 according to which at least one end of the non-cured hose is held clampingly on the flexible mandrel when the flexible mandrel together with the hose is slid onto the inner mandrel portion having the finally desired configuration of the hose.

* * * * *